United States Patent
Iwaki et al.

(10) Patent No.: US 11,644,091 B2
(45) Date of Patent: May 9, 2023

(54) HYDROMECHANICAL CONTINUOUSLY VARIABLE SPEED TRANSMISSION

(71) Applicant: KANZAKI KOKYUKOKI MFG. CO., LTD., Amagasaki (JP)

(72) Inventors: Koji Iwaki, Amagasaki (JP); Tomoyuki Tsuji, Amagasaki (JP); Ryo Motooka, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 17/709,818

(22) Filed: Mar. 31, 2022

(65) Prior Publication Data

US 2022/0316570 A1    Oct. 6, 2022

(30) Foreign Application Priority Data

Mar. 31, 2021    (JP) .............................. JP2021-060436

(51) Int. Cl.
  *F16H 47/04*    (2006.01)
(52) U.S. Cl.
  CPC .................................... *F16H 47/04* (2013.01)
(58) Field of Classification Search
  CPC ......... F16H 47/04; F15B 11/08; A01D 69/005
  USPC ........................................................ 475/72
  See application file for complete search history.

(56) References Cited

U.S. PATENT DOCUMENTS

| 3,619,544 A | * | 11/1971 | Ullmann | ................. | F15B 11/08 |
| | | | | | 219/69.16 |
| 8,337,353 B2 | | 12/2012 | Iwaki et al. | | |
| 2010/0051410 A1 | | 3/2010 | Iwaki et al. | | |
| 2018/0023672 A1 | * | 1/2018 | Watt | ....................... | F16H 3/724 |
| | | | | | 74/15.4 |
| 2018/0192590 A1 | * | 7/2018 | Trowbridge | ............ | F15B 1/024 |

FOREIGN PATENT DOCUMENTS

| JP | 4162359 B2 | 8/2008 |
| JP | 4162359 B2 | 10/2008 |
| JP | 2010-076748 A | 4/2010 |
| JP | 2018-009692 A | 1/2018 |

\* cited by examiner

*Primary Examiner* — Colby M Hansen
(74) *Attorney, Agent, or Firm* — Sterne, Kessler, Goldstein & Fox P.L.L.C.

(57) ABSTRACT

A hydromechanical continuously variable speed transmission is provided. The hydromechanical continuously variable speed transmission can include: the HST 10 in which the planetary gear mechanism 11 is housed in the planetary gear support case 71 mounted on a face of the center section 35 to form the HMT unit 100, the face being on the side opposite to the side on which the HST case 23 is mounted, and the HMT unit 100 is further provided with the housing mounting face 35*d* for fixing the HMT unit 100 to the housing 91 of the traveling power transmission mechanism 89, the housing mounting face 35*d* being provided on the center section 35 so as to surround the outer circumference of the mounting face 71*a* on which the planetary gear support case 71 is mounted.

3 Claims, 9 Drawing Sheets

HYDROMECHANICAL CONTINUOUSLY VARIABLE SPEED TRANSMISSION

CROSS-REFERENCE TO RELATED APPLICATION

This application claims priority to JP2021-060436, filed on Mar. 31, 2021, which is incorporated by reference herein in its entirety.

TECHNICAL FIELD

At least one embodiment of the present invention relates to a hydromechanical continuously variable speed transmission.

BACKGROUND

Conventionally, a working and traveling vehicle is known that is equipped with a hydromechanical continuously variable speed transmission that changes the speed of output rotation of an engine, for example, a hydromechanical transmission (HMT) that is excellent in operability of changing speed (capable of clutchless shifting) as compared with a gear transmission mechanism and excellent in efficiency of power transmission as compared with a hydrostatic transmission (HST). A typical HMT includes a set of planetary gear mechanism. This mechanism specifically is configured such that constant speed power of an engine is input to any one element (first element) of three elements that are a sun gear, an internal gear, and a planetary carrier constituting a planetary gear mechanism, power of an HST of which speed has changed is input to one element (second element) of the other two elements, and combined power from the engine and the HST is output from the last element (third element). For example, JP-B2 4162359 Gazette discloses this technique.

As in the related art, a housing that houses a traveling power transmission mechanism includes a front housing connected to an engine, and an intermediate housing connected to the front housing, and the HST is housed in the front housing and supported by a front wall of the intermediate housing. The planetary gear mechanism is housed in the intermediate housing and supported between the center section of the HST and an inner wall of the intermediate housing.

In the related art, the cross-sectional area of the rear face of the HST case and the cross-sectional area of the front face of the intermediate housing accommodating the planetary gear mechanism are configured to be substantially the same size. A conventional case, since made large, occupies a large volume when the HST is disposed in the housing of the traveling power transmission mechanism. Therefore, the housing itself needs to be made large, which limits the space for arrangement. In addition, maintenance of the planetary gear mechanism requires much work, since after removing the front housing from the engine, removing of the HST from the intermediate housing is also required.

SUMMARY

The present invention has been made in view of such a present problem. An object of the present invention is to provide a hydromechanical continuously variable speed transmission capable of reducing the size of an HMT housed in a housing and facilitating maintenance of a planetary gear mechanism.

To achieve the object, a hydromechanical continuously variable speed transmission is a hydromechanical continuously variable speed transmission that changes a speed of output rotation of an engine, and includes: an HST in which a hydraulic pump and a hydraulic motor are housed in an HST case, and including a center section mounted on the HST case and fluidly connecting the hydraulic pump and the hydraulic motor; and a planetary gear mechanism configured to output, in combination with the HST, continuously varied speed to a traveling power transmission mechanism, where the planetary gear mechanism is housed in a planetary gear support case mounted on a face of the center section to form an HMT unit, the face being on a side opposite to a side on which the HST case is mounted, and the HMT unit is further provided with a housing mounting face for fixing the HMT unit to a housing of the traveling power transmission mechanism, the housing mounting face being provided on an outer circumference of a mounting face, of the center section, on which the planetary gear support case is mounted.

To achieve the object, in the hydromechanical continuously variable speed transmission, a mounting portion for partitioning an inside of the housing into a first chamber opened toward a side of the engine and a second chamber opened toward a side of the traveling power transmission mechanism is provided on an inner wall face of the housing to protrude inward, and when the HMT unit is fixed to the housing, the planetary gear mechanism is positioned on a side of the second chamber while the housing mounting face of the center section is in close contact with an entire circumference of the mounting portion.

To achieve the object, in the hydromechanical continuously variable speed transmission, a single drive shaft constituting the traveling power transmission mechanism is disposed in the second chamber of the housing, and a portion, opposing the drive shaft, of the planetary gear support case is cut out.

With the above configuration, the planetary gear mechanism in the assembled state can be housed in the planetary gear support case and fixed to the rear face of the center section, which improves efficiency of assembly. In addition, the planetary gear support case of the HMT unit can be downsized. This allows the HMT unit to be housed in the housing of the traveling power transmission mechanism without making the housing large.

The above-described or other features and effects will be apparent in the following detailed description of the invention with reference to the accompanying drawings.

DETAILED DESCRIPTION

Figure 1:
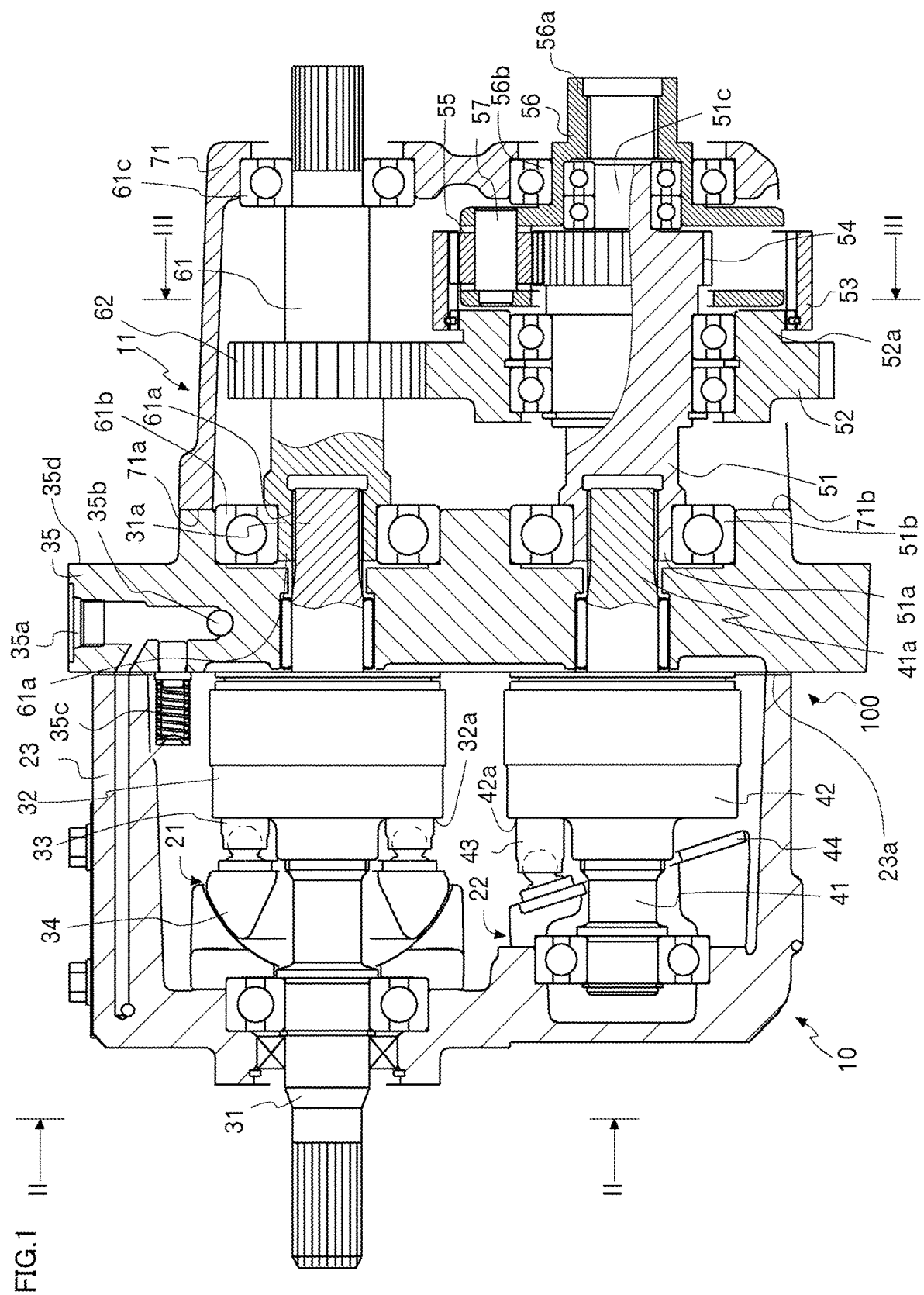
FIG. 1 is a partial cross-sectional side view illustrating a hydromechanical continuously variable speed transmission.

Now, an embodiment of the invention will be described. Hereinafter, some embodiments will be described with reference to the accompanying drawings. The embodiments and the drawings are merely examples and are not restrictive. In some drawings, the same element is denoted by the same reference numeral.

Figure 2:
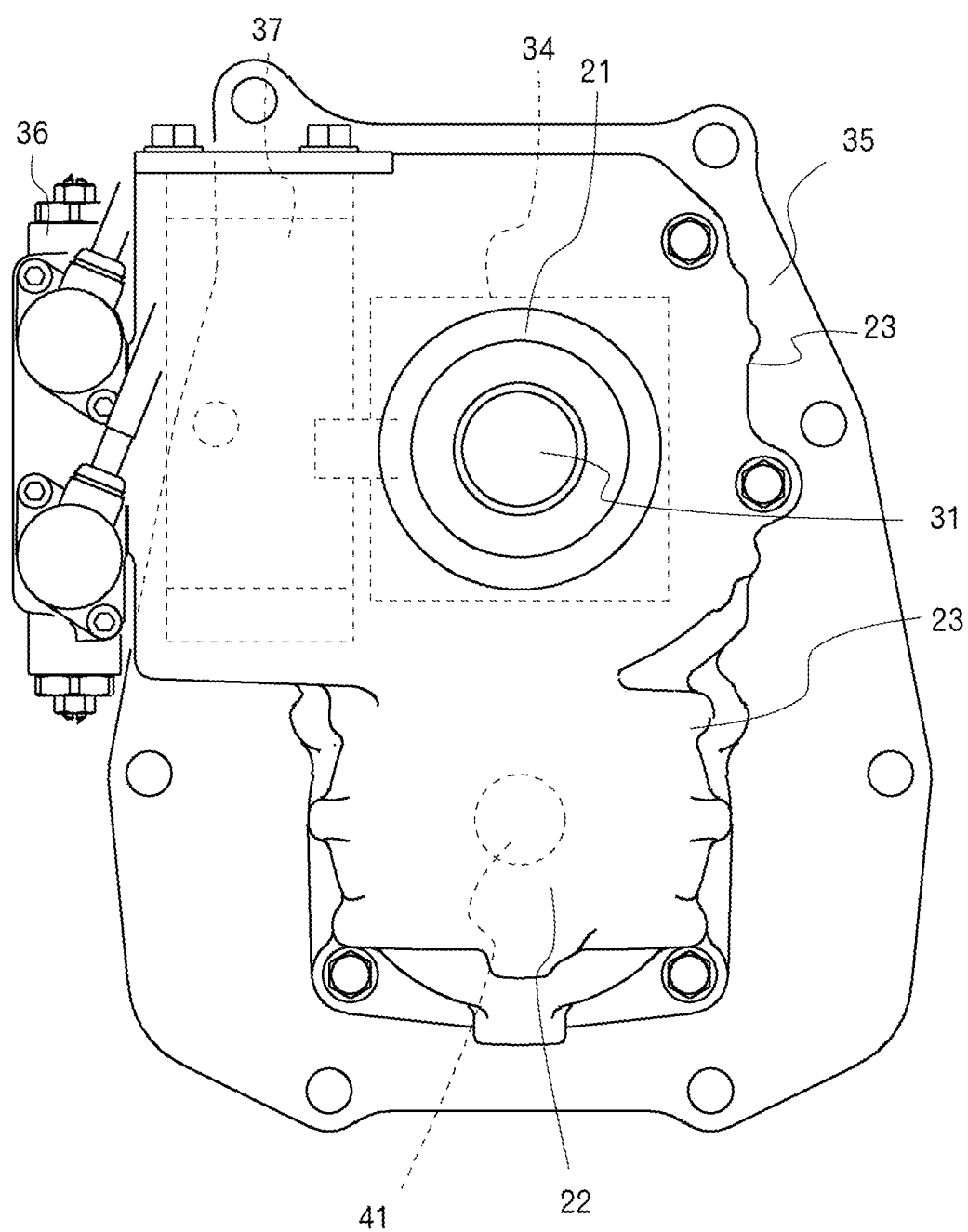
FIG. 2 is a cross-sectional view taken along line II-II illustrating the hydromechanical continuously variable speed transmission.
Figure 3:
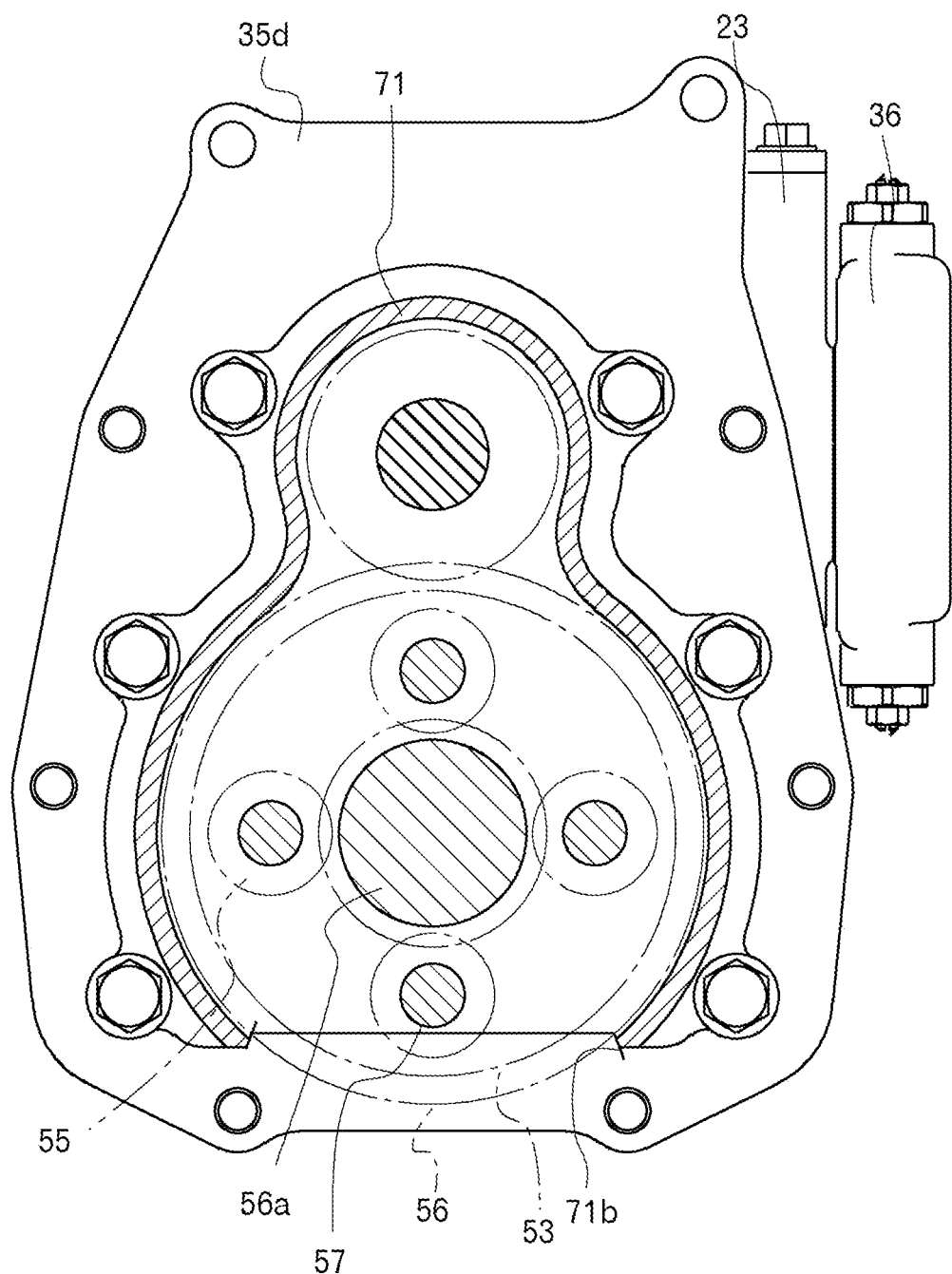
FIG. 3 is a cross-sectional view taken along line illustrating the hydromechanical continuously variable speed transmission.

A hydromechanical continuously variable speed transmission according to one embodiment of the present invention will be described. The hydromechanical continuously variable speed transmission is a transmission of a type of hydromechanical transmission (HMT), and is applicable to a work vehicle, for example, an agricultural tractor. As illustrated in FIGS. 1 to 3, the transmission of a type of HMT includes an HST 10 and a planetary gear mechanism 11. Specifically, in the HST 10, a hydraulic pump 21 and a hydraulic motor 22 are integrated and housed in a common HST case 23. The hydraulic pump 21 is an axial piston pump including a pump shaft 31 for transmitting power from a flywheel 16 on a side of an engine 15 in the HST case 23, a cylinder block 32 fitted to the pump shaft 31 so as not to rotate relatively to the pump shaft 31, a plurality of pump pistons 33 disposed in cylinder holes 32a bored in the cylinder block 32, the pump pistons 33 being allowed to reciprocate while maintaining oil tightness, and a movable swash plate 34 that causes the pump pistons 33 to reciprocate in an axial direction. A rear end of the pump shaft 31 extends rearward through a center section 35 having a flat plate shape. A fitting portion 31a to be fitted to a connecting portion 61a provided at the front end of a pump connecting shaft 61 described later is provided at the rear end of the pump shaft 31.

The movable swash plate 34 is linked with a speed changing unit provided in a vehicle seat, for example, a speed changing pedal, by an appropriate link mechanism. According to an amount by which the speed changing pedal is pushed, an electromagnetic proportional valve 36 is driven to reciprocate the pump pistons 33, whereby the discharge amount and discharge direction of oil of the hydraulic pump 21 can be controlled.

The hydraulic motor 22 is an axial piston motor including a motor shaft 41 supported parallel to the pump shaft 31 in the HST case 23, a cylinder block 42 fitted to the motor shaft 41 so as not to rotate relatively to the motor shaft 41, a plurality of pistons 43 disposed in cylinder holes 42a bored in the cylinder block 42, the pistons 43 being allowed to reciprocate while maintaining oil tightness, and an un-movable swash plate 44 for converting the movement of the pistons 43 that extracts or contracts by the oil from the hydraulic pump 21 into rotational driving power of the cylinder block 42. The rear end of the motor shaft 41 extends rearward through the center section 35. A fitting portion 41a to be fitted to a connecting portion 51a provided at the front end of a sun gear shaft 51 described later is provided at the rear end of the motor shaft 41.

A rear end opening of the HST case 23 is closed by the center section 35 to form an oil reservoir in the HST case 23. The hydraulic pump 21 and the hydraulic motor 22 are slidably and rotatably mounted on the center section 35. Although not illustrated, oil passages connecting a pair of suction and discharge ports of the hydraulic pump 21 and a pair of suction and discharge ports of the hydraulic motor 22 to form a closed circuit is provided in the center section 35 as in a typical configuration.

With this configuration, by pushing the speed changing pedal to tilt the movable swash plate 34 from the neutral position by an arbitrary angle while engine power is input to the pump shaft 31, the pump pistons 33 supported in the cylinder block 32 is driven by the movable swash plate 34 to reciprocate to discharge pressurized oil, and the discharged pressurized oil is fed to the hydraulic motor 22 via the oil passage in the center section 35. The pressurized oil drives the pistons 43 of the hydraulic motor 22 to extend and contract to rotate the cylinder block 42, and the rotation is extracted as rotational power of the motor shaft 41.

Figure 4:
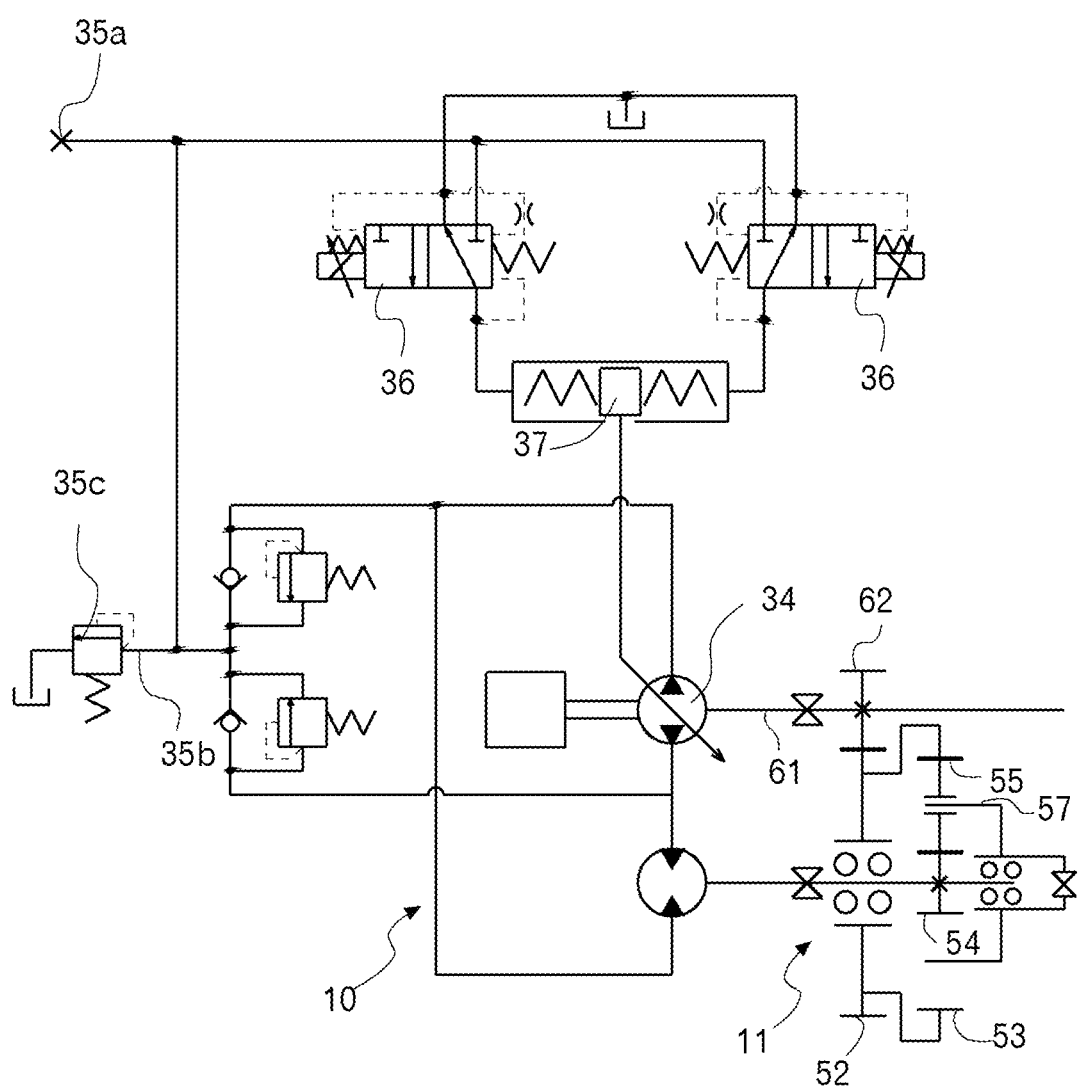
FIG. 4 is a hydraulic circuit diagram illustrating a hydraulic configuration.

As illustrated in FIG. 4, an oil inlet port 35a is provided on the upper end face of the center section 35. Oil is added from the outside to fill the inside of the closed circuit with oil. The oil supplied from the oil inlet port 35a flows into the oil passage in the HST case 23, and causes a servo piston 37 that operates the movable swash plate 34 to reciprocate according to the opening degree of the electromagnetic proportional valve 36.

When the servo piston 37 is displaced from the initial position, the movable swash plate 34 tilts to increase the stroke of the pump pistons 33. As a result, the hydraulic pump 21 works to discharge pressurized oil. A portion of the oil from the oil inlet port 35a is supplied to a charge line 35b and the oil is added to the closed circuit connecting the hydraulic pump 21 and the hydraulic motor 22. The operating pressure of the servo piston 37 and the oil charge pressure are set by a charge relief valve 35c. Excessive pressure is released from the charge relief valve 35c to the oil reservoir in the HST case 23.

Next, the planetary gear mechanism 11 will be described with reference to FIGS. 1 to 3.

The planetary gear mechanism 11 includes the sun gear shaft 51 disposed rearward of the HST 10 and disposed coaxially with the motor shaft 41, a constant-speed driven gear 52 rotatably supported by the sun gear shaft 51, an internal gear 53 rotating integrally with the constant-speed driven gear 52, a sun gear 54 formed on the outer periphery of the sun gear shaft 51 by chipping, and planetary gears 55 meshing with the sun gear 54 and the internal gear 53. A plurality of planetary gears 55 are rotatably supported by a carrier pin 57 provided on a planetary carrier 56, and the planetary carrier 56 has a planetary carrier shaft 56a, which is an HMT output shaft, at the rotational center of the planetary carrier 56. The planetary carrier shaft 56a has a cylindrical shape. The distal end 51c of the sun gear shaft 51 is inserted in the front end portion of the planetary carrier shaft 56a via a bearing, whereby the planetary carrier shaft 56a is supported by the sun gear shaft 51. The constant-speed driven gear 52 meshes with a constant-speed drive gear 62 provided on the pump connecting shaft 61 connected to the pump shaft 31. The rotational power of the pump connecting shaft 61 is transmitted from the constant-speed driven gear 52 to the internal gear 53. The reference numeral 52a denotes a boss portion integrally formed on a side surface of the constant-speed driven gear 52. An end portion of the internal gear 53 is situated at the boss portion 52a and meshes with the teeth of the boss portion 52a, so that the internal gear 53 is supported by the boss portion 52a so as not to relatively rotate. The internal gear 53 and the boss portion 52a are fixed together by a snap ring or a circlip so as not to move relatively to each other in the axial direction.

With this configuration, power from the flywheel 16 on the side of the engine 15 is changed into rotational power of the pump shaft 31 and the pump connecting shaft 61, and the power is transmitted from the constant-speed drive gear 62 provided on the pump connecting shaft 61 to the constant-speed driven gear 52. The constant-speed driven gear 52 rotates the internal gear 53. Meanwhile, the rotational driving power of the hydraulic motor 22 is transmitted to the sun gear shaft 51 and input to the sun gear 54. The planetary gears 55 meshing with the sun gear 54 and the internal gear 53 rotate and revolve, whereby HMT power is output from the planetary carrier shaft 56a. That is, the power from the engine 15 is transmitted to the planetary gears 55 via the pump shaft 31, the pump connecting shaft 61, the constant-speed drive gear 62, and the constant-speed driven gear 52, and the rotational driving power of the hydraulic motor 22 is transmitted to the planetary gears 55 via the motor shaft 41, the sun gear shaft 51, and the sun gear 54. By combining the two driving powers in the planetary gear mechanism 11, the rotational speed of the planetary carrier shaft 56a, which is the HMT output shaft, provided on the planetary carrier 56 can be varied continuously, and also, a neutral state of the rotational power not being transmitted can be realized.

The planetary gear mechanism 11 is disposed on a rear face of the center section 35 on the side opposite to the side on which the HST case 23 is mounted. A bearing 61b is attached to the outer periphery of the connecting portion 61a of the pump connecting shaft 61, and a bearing 51b is attached to the outer periphery of the connecting portion 51a of the sun gear shaft 51. The bearings 61b and 51b are fitted in circular recesses formed in the rear face of the center section 35.

The planetary gear mechanism 11 is housed in a planetary gear support case 71. As illustrated in FIG. 3, the planetary gear support case 71 has a shape having two spaces combined in the up-down direction, the two spaces each having a substantially circular cross-section with a portion thereof cut out. The pump connecting shaft 61, the constant-speed drive gear 62, and the like are housed in the upper space of the planetary gear support case 71, and the rear end side of the pump connecting shaft 61 is supported by a rear wall of the planetary gear support case 71 via a bearing 61c. The planetary gear mechanism 11 and the planetary carrier shaft 56a, which is the HST output shaft, are housed in the lower space of the planetary gear support case 71, and the rear end side of the planetary carrier shaft 56a is supported by the rear wall of the planetary gear support case 71 via a bearing 56b. The bottom portion of the planetary gear support case 71 is cut out to form an opened cutout 71b.

As illustrated in FIGS. 1 and 3, the cutout 71b is formed at a position, in the front-rear direction, where at least the constant-speed driven gear 52 and the internal gear 53 are disposed. As illustrated in FIG. 3, the cutout 71b is recessed to the upper side and the most recessed face of the cutout 71b is further in the upper side than the lowermost ends of the constant-speed driven gear 52 and the internal gear 53. Accordingly, the constant-speed driven gear 52 and the internal gear 53 are housed with portions thereof protruding downward beyond the lower face of the planetary gear support case 71.

As described above, the HST case 23 housing the HST 10, the center section 35, and the planetary gear support case 71 housing the planetary gear mechanism 11 constitute the HMT unit 100.

Figure 5:
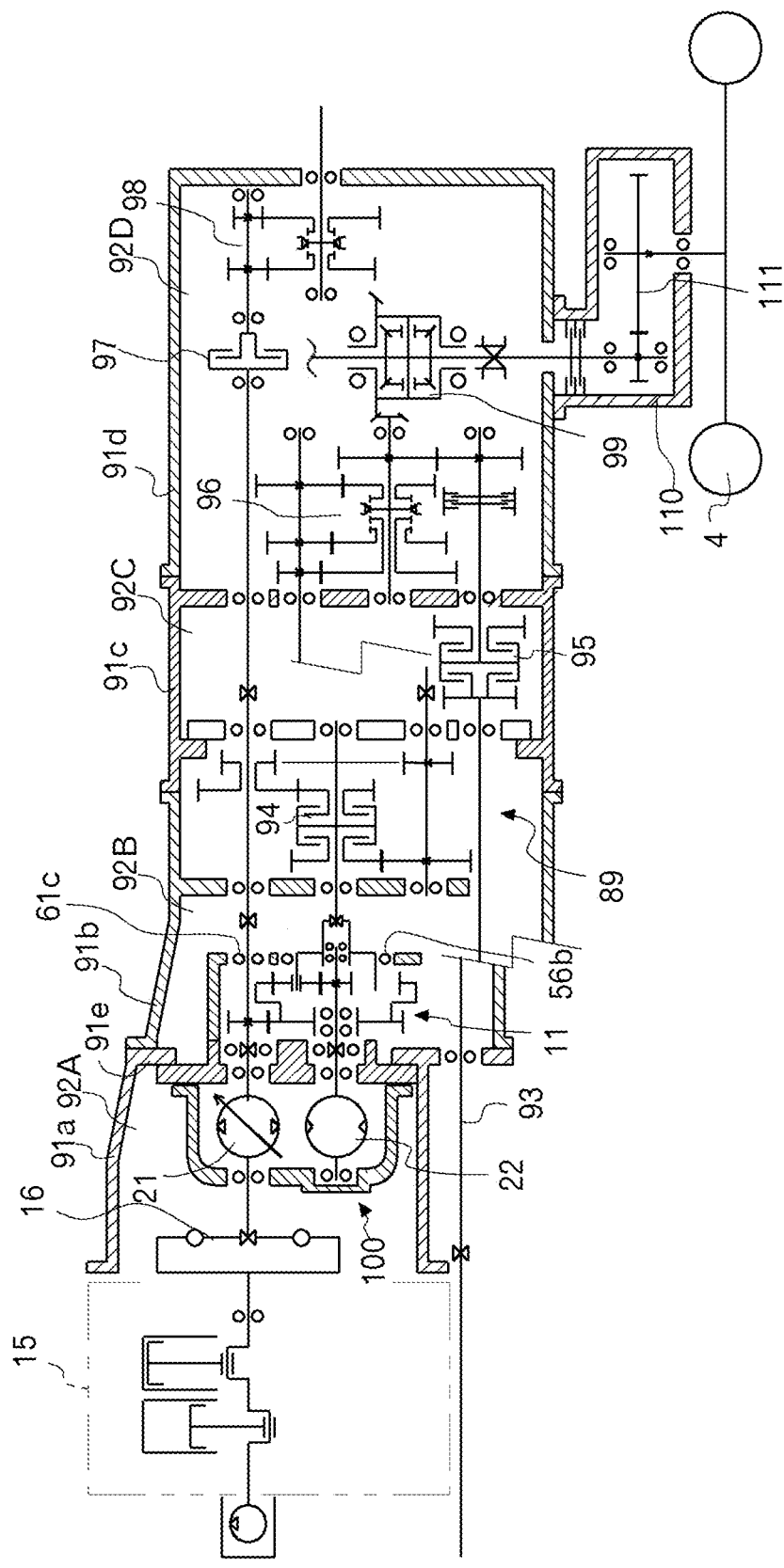
FIG. 5 is a partial cross-sectional side view illustrating a travel driving unit of a work vehicle.

In the present embodiment, the HMT unit 100 is fixed inside a housing 91 of a traveling power transmission mechanism 89 of an agricultural tractor (not illustrated). As illustrated in FIG. 5, the traveling power transmission mechanism 89 is a mechanism for transmitting power from the engine 15 to a traveling system including front wheels and rear wheels 4 and 4, and the housing 91 of the traveling power transmission mechanism 89 is connected to the rear of the engine 15 and houses various mechanisms such as a forward-reverse switching clutch 94, a front wheel acceleration switching clutch 95, a three-stage auxiliary transmission mechanism 96, a PTO clutch 97, a PTO transmission mechanism 98, and a differential gear 99.

The housing 91 of the traveling power transmission mechanism 89 includes a front housing 91a, an intermediate housing 91b, a rear housing 91c, and a differential housing 91d connected to each other. The inside of the front housing 91a is partitioned into a first chamber 92A opened to the side of the engine 15 and a second chamber 92B opened to the side of the traveling power transmission mechanism 89. The rear face of the engine 15 and the front housing 91a form the first chamber 92A. The first chamber 92A houses the HST case 23 and the center section 35 of the HMT unit 100. A mounting portion 91e, described later, of the front housing 91a, the rear face of the center section 35, and the intermediate housing 91b form the second chamber 92B. The second chamber 92B houses the planetary gear support case 71 and a front wheel drive shaft 93 of the HMT unit 100.

The housing 91 also has a third chamber 92C housing the forward-reverse switching clutch 94 and the front wheel acceleration switching clutch 95, and a fourth chamber 92D housing the auxiliary transmission mechanism 96, the PTO clutch 97, the PTO transmission mechanism 98, and the differential gear 99. The third chamber 92C is mainly configured with the rear housing 91c, and the fourth chamber 92D is mainly configured with the differential housing 91d.

The traveling power transmission mechanism 89 transmits power of the traveling system and a work system. For the traveling system, the driving power from the planetary carrier shaft 56a, which is the HMT output shaft, is transmitted to the auxiliary transmission mechanism 96 via the forward-reverse switching clutch 94. The power transmitted to the auxiliary transmission mechanism 96 is transmitted from a final gear 111 housed in a final gear case 110 to the rear wheels 4 and 4 via the differential gear 99.

For the traveling system, the power transmitted to the auxiliary transmission mechanism 96 is transmitted to the front wheel drive shaft 93. The front wheel acceleration switching clutch 95 is provided at midway of the front wheel drive shaft 93.

In the present embodiment, the HMT unit 100 is fixed to the front housing 91a of the housing 91. The center section 35 of the HMT unit 100 has a mounting face 35d for fixing the front housing 91a. The mounting face 35d is provided on the rear face of the center section 35 so as to surround the outer circumference of the mounting face 71a of the planetary gear support case 71 along the outer rim of the center section 35. The mounting face 35d is provided with a plurality of holes to which bolts 38 and a stud bolt 38a described later are inserted.

Figure 6:
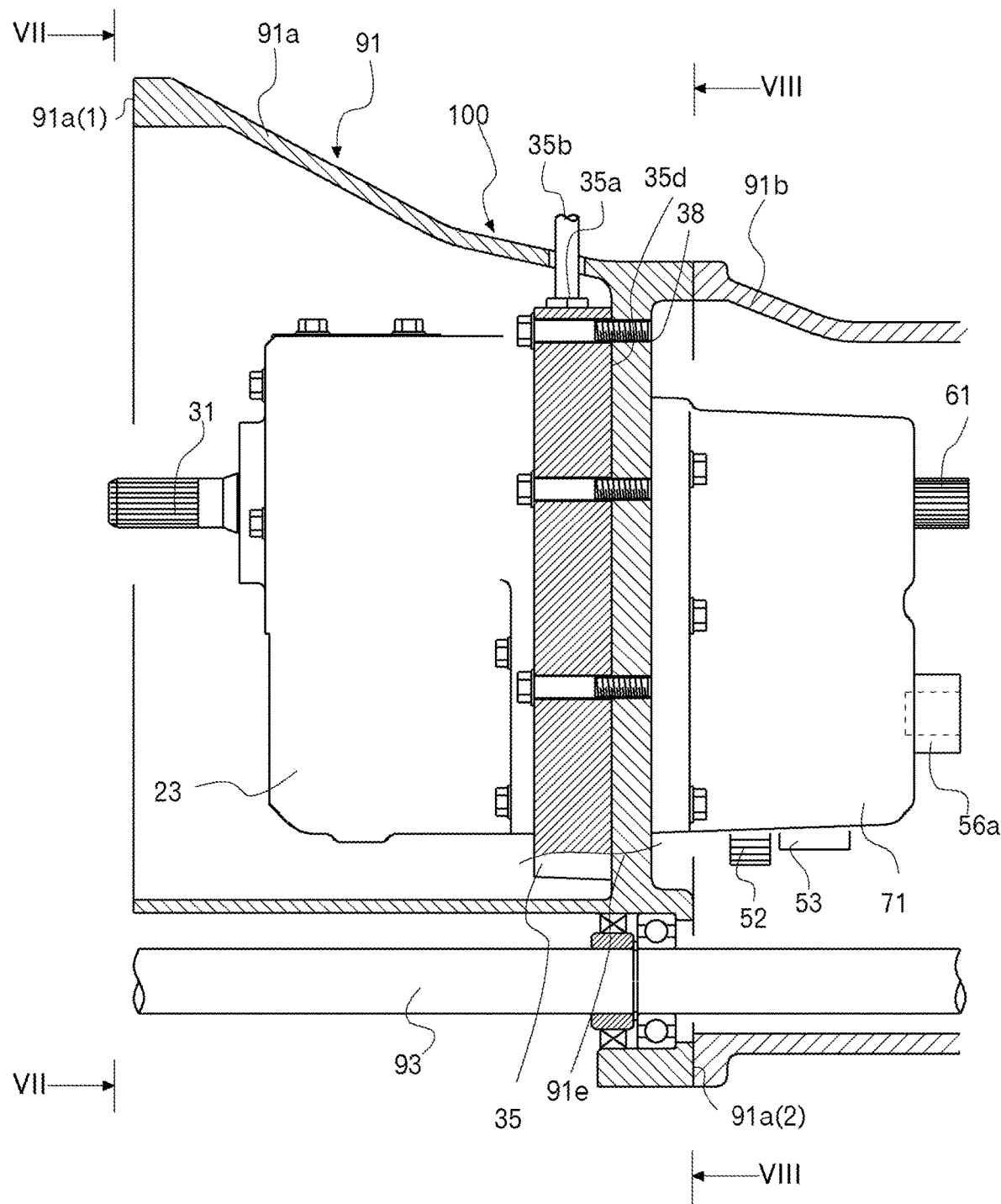
FIG. 6 is a partially enlarged cross-sectional side view illustrating an arrangement of the hydromechanical continuously variable speed transmission in the travel driving unit of the work vehicle.
Figure 7:
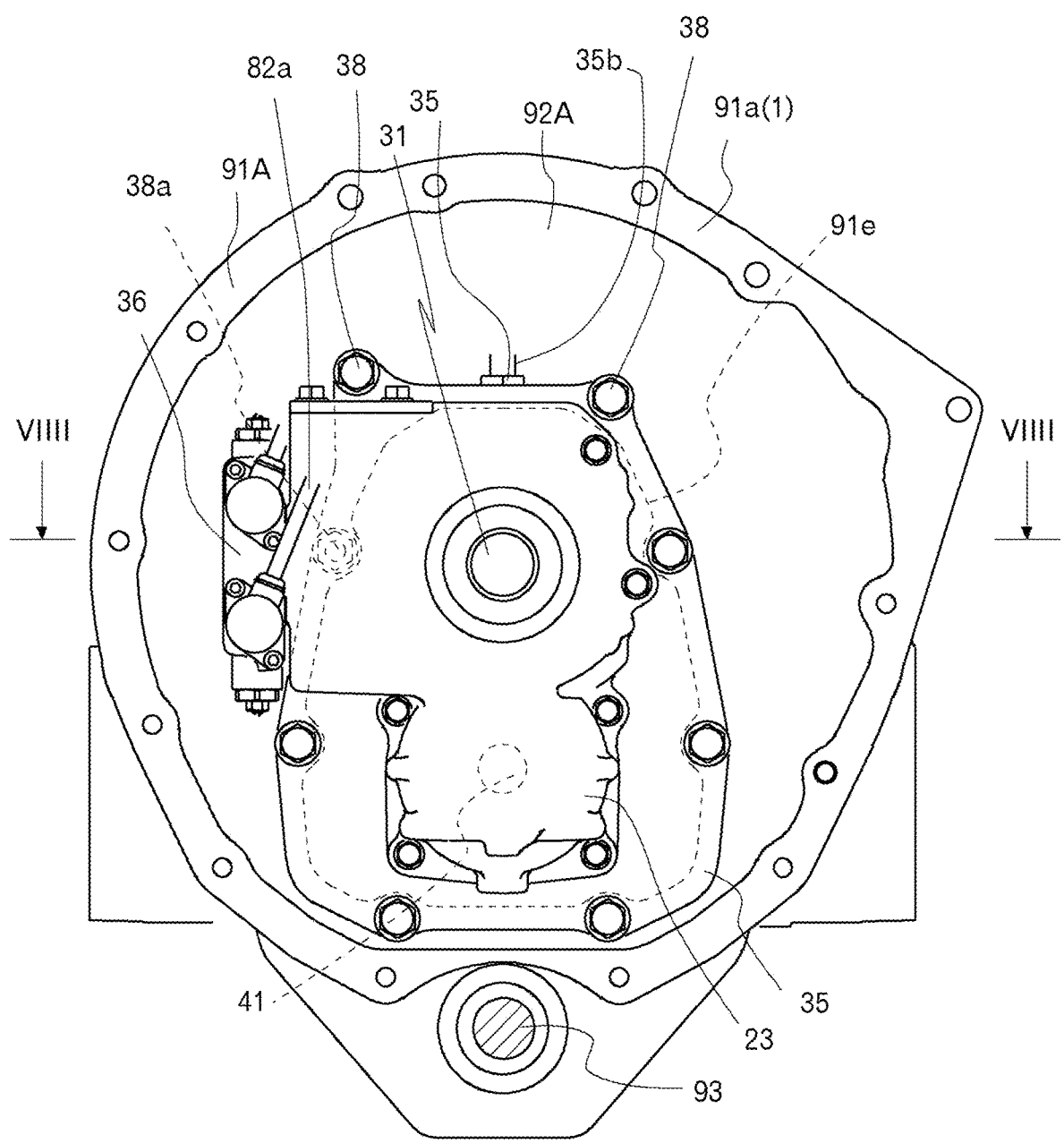
FIG. 7 is a partially enlarged cross-sectional side view illustrating the arrangement of the hydromechanical continuously variable speed transmission in the travel driving unit of the work vehicle.
Figure 8:
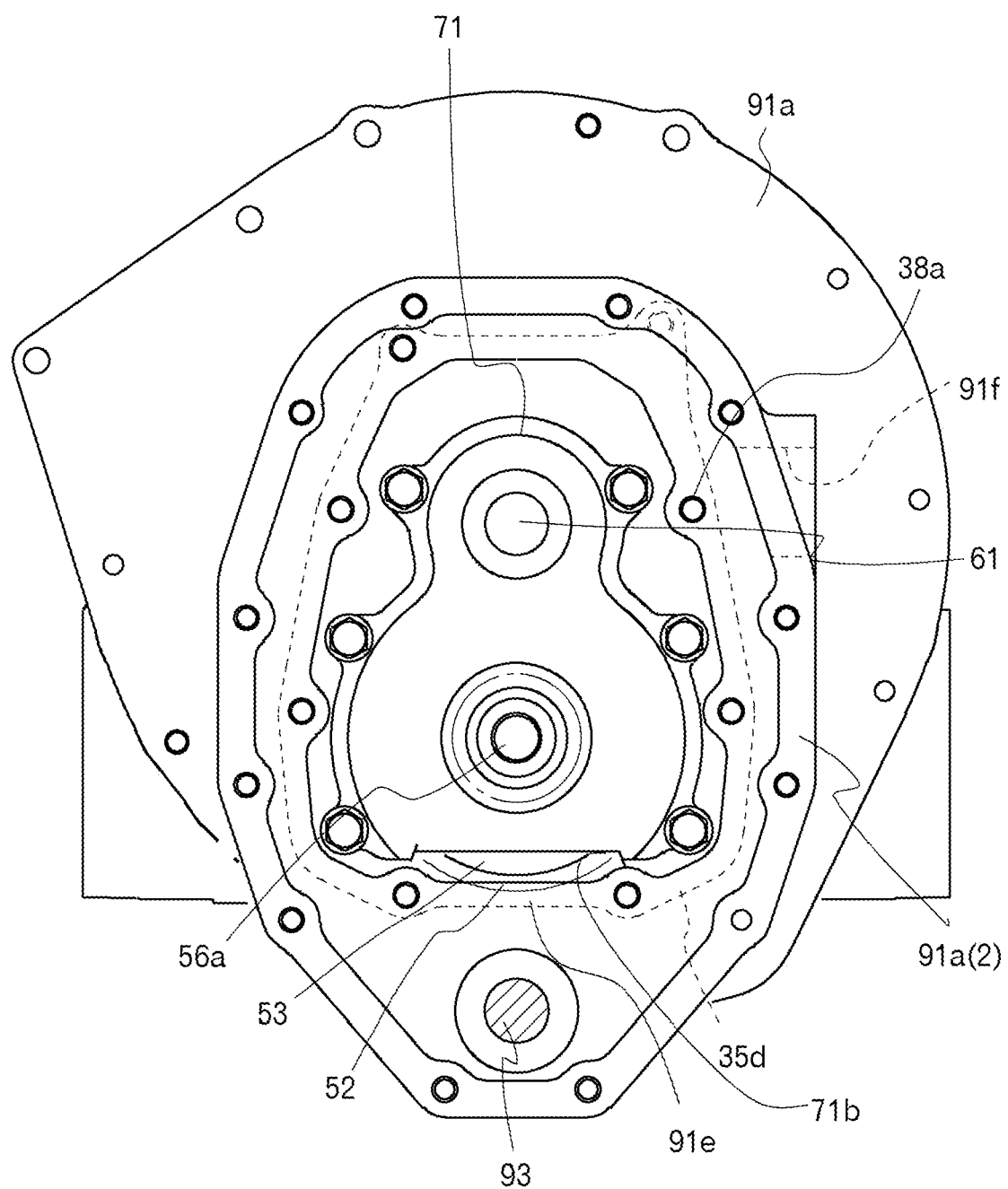
FIG. 8 is a cross-sectional view taken along line VIII-VIII illustrating an arrangement of the hydromechanical continuously variable speed transmission in the travel driving unit of the work vehicle.

As illustrated in FIGS. 6 to 8, the front housing 91a has a front end flange face 91a(1) for connecting the front housing 91a to the engine 15 and a rear end flange face 91a(2) for connecting the front housing 91a to the intermediate housing 91b. The mounting portion 91e for demarcating the first chamber 92A from the second chamber 92B is provided at a place further to the inner side of the housing 91 along the rotational axis than the rear end flange face 91a(2). The mounting portion 91e is provided to protrude from the inner wall face of the rear end of the front housing 91a toward the rotational axis, and has screw holes at places each corresponding to the respective one of bolt insertion holes provided in the mounting face 35d of the center section 35. The mounting face 35d of the center section 35 is placed on the front face of the mounting portion 91e, and fixed by the bolts 38 and the stud bolt and nut 38a and 38b, whereby the HMT unit 100 is fixed to the front housing 91a.

As illustrated in FIGS. 6 and 8, the bolts 38 as fixing members are put through the front end flange face 91a(1) from the front side (side of the flywheel) toward the rear side (side of the planetary gear support case 71) to penetrate the center section 35 that has been brought into contact with the front face of the mounting portion 91e and screwed into the mounting portion 91e.

Figure 9:
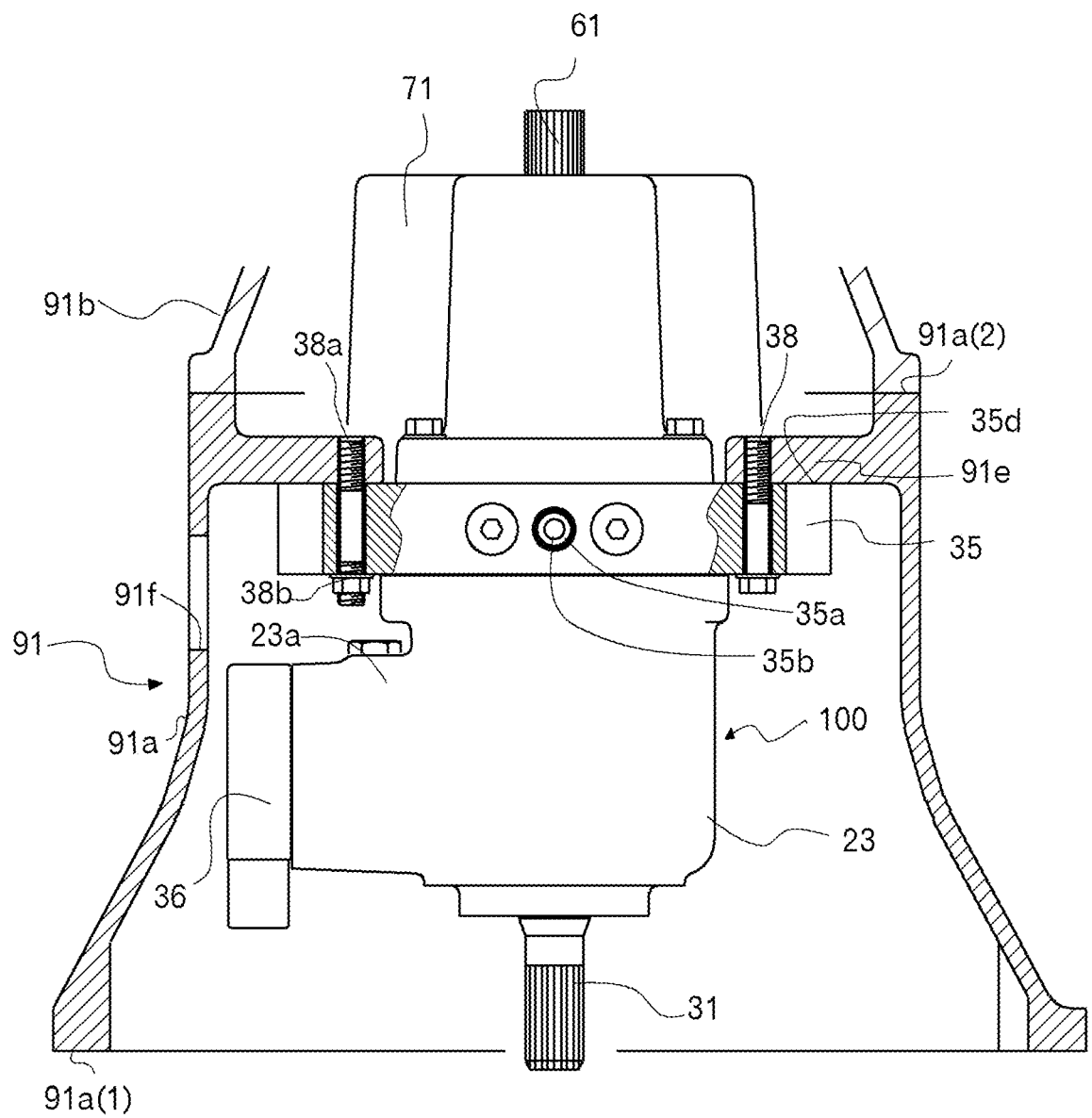
FIG. 9 is a cross-sectional view taken along line VIIII-VIIII illustrating the arrangement of the hydromechanical continuously variable speed transmission in the travel driving unit of the work vehicle.

As illustrated in FIG. 9, for the bolt insertion hole provided at a place where the front face of the center section 35 is blocked by the servo piston housing 23a of the HST case 23, the tip of the stud bolt 38a screwed into the mounting portion 91e is inserted through the bolt insertion hole, and the nut 38b is inserted through an opening 91f provided in the peripheral wall of the front housing 91a and then screwed onto the tip of the stud bolt 38a. The opening 91f is used for passing the wiring of the electromagnetic proportional valve 36 and a hydraulic oil supply tube for the closed circuit to the inside of the front housing 91a.

With this configuration, the HMT unit 100 will become detachable from the front housing 91a by only separating the engine 15 from the front end flange face 91a(1) of the front housing 91a with the front housing 91a still coupled to the intermediate housing 91b. This makes maintenance work of the HST 10 as well as the maintenance work of the planetary gear mechanism 11 easy.

In addition, when fixing the HMT unit 100 in the front housing 91a, the planetary gear mechanism 11 is disposed on the side of the second chamber 92B with the mounting face 35d of the center section 35 in close contact with the entire circumference of the mounting portion 91e. That is, making the center section 35 in close contact with the entire circumference of the mounting portion 91e keeps an oil-tight state, and thus the first chamber 92A can be used as a dry chamber and the second chamber 92B can be used as an oil reservoir.

A single drive shaft constituting the traveling power transmission mechanism 89 is disposed in the second chamber 92B of the housing 91. In the present embodiment, the front wheel drive shaft 93 that drives the front wheel by the traveling power is disposed.

The bottom portion, which is a portion opposing the front wheel drive shaft 93, of the planetary gear support case 71 is cut out to form the cutout 71b to prevent contact between the planetary gear support case 71 and the front wheel drive shaft 93.

When completely covering the constant-speed driven gear 52 and the internal gear 53 with the planetary gear support case 71 without providing the cutout 71b, the bottom face of the planetary gear support case 71 inevitably protrudes downward. In contrast, by opening the bottom portion by forming such a cutout 71b that will not affect the strength of the planetary gear support case 71, the planetary gear support case 71 can be downsized, and thus the planetary gear support case 71 can be disposed close to the front wheel drive shaft 93.

The supplied lubricating oil in the second chamber 92B is efficiently supplied to the planetary gear mechanism 11 from the cutout 71b. That is, the inside of the second chamber 92B is supplied with lubricating oil, and the lower portions of the constant-speed driven gear 52 and the internal gear 53 of the planetary gear mechanism 11 are in contact with the lubricating oil. During traveling, the portions in contact with the lubricating oil scoop up the oil to improve lubricity to the lubricated portions.

As described above, the hydromechanical continuously variable speed transmission that changes the speed of output rotation of the engine 15 is a transmission of a type of HMT (hydromechanical transmission) and includes: the HST 10 in which the hydraulic pump 21 and the hydraulic motor 22 are housed in the HST case 23, and including the center section 35 mounted on the HST case 23 and fluidly connecting the hydraulic pump 21 and the hydraulic motor 22; and the planetary gear mechanism 11 configured to output, in combination with the HST 10, continuously varied speed to the traveling power transmission mechanism 89, where the planetary gear mechanism 11 is housed in the planetary gear support case 71 mounted on a face of the center section 35 to form the HMT unit 100, the face being on the side opposite to the side on which the HST case 23 is mounted, and the HMT unit 100 is further provided with the housing mounting face 35d for fixing the HMT unit 100 to the housing 91 of the traveling power transmission mechanism 89, the housing mounting face 35d being provided on the center section 35 so as to surround the outer circumference of the mounting face 71a on which the planetary gear support case 71 is mounted.

With the above configuration, the planetary gear mechanism 11 in the assembled state can be housed in the planetary gear support case 71 and fixed to the rear face of the center section 35, which improves efficiency of assembly.

Furthermore, it may be configured that the mounting portion 91e for partitioning the inside of the housing 91 into the first chamber 92A opened toward the side of the engine 15 and the second chamber 92B opened toward the side of the traveling power transmission mechanism 89 is provided on the inner wall face of the housing 91 to protrude inward, and when the HMT unit 100 is fixed to the housing 91, the planetary gear mechanism 11 is positioned on the side of the second chamber 92B while the housing mounting face 35d of the center section 35 is in close contact with the entire circumference of the mounting portion 91e. The upper portion of the planetary gear support case 71 houses only the constant-speed drive gear 62, so that the upper portion can be formed to have a small volume. This allows the mounting portion 91e to be disposed in a space behind the center section 35, the space being in the opposite side of the mounting face to which the HST case 23 is mounted. This allows the HMT unit 100 to be housed inside the housing 91 of the traveling power transmission mechanism 89 without making the housing 91 large.

With this configuration, when fixing the HMT unit 100 to the housing 91, the planetary gear mechanism 11 can be lubricated with the center section 35 holding the lubricating oil for the traveling power transmission mechanism 89 in the housing 91.

Furthermore, the front wheel drive shaft 93 constituting the traveling power transmission mechanism 89 may be disposed in the second chamber 92B of the housing 91, and the lower portion of the planetary gear support case 71 opposing the front wheel drive shaft 93 may be cut out.

With this configuration, the planetary gear support case 71 of the HMT unit 100 can be downsized, and the planetary gear support case 71 can be disposed close to the front wheel drive shaft 93 in the second chamber 92B of the housing 91 without interfering with the front wheel drive shaft 93. Furthermore, lubricating oil can be efficiently supplied from the cutout 71*b* to the planetary gear mechanism 11.

The above description relates to specific examples according to the present invention, and various modifications can be made without departing from the spirit of the present invention. The appended claims are intended to include such applications within the true scope and spirit of the present invention.

Thus, all the embodiments disclosed in the present application should be construed as illustrative and not restrictive. The scope of the present invention is recited in the following claims rather than in the above description, and any modification that falls within the scope equivalent to the meaning of the claims should be included in the scope of the present invention.

What is claimed is:

1. A hydromechanical continuously variable speed transmission that changes a speed of output rotation of an engine, the hydromechanical continuously variable speed transmission comprising:
    a hydrostatic transmission £(HST) in which a hydraulic pump and a hydraulic motor are housed in an HST case, and including a center section mounted on the HST case and fluidly connecting the hydraulic pump and the hydraulic motor; and
    a planetary gear mechanism configured to output, in combination with the HST, continuously varied speed to a traveling power transmission mechanism,
    wherein the planetary gear mechanism is housed in a planetary gear support case mounted on a face of the center section to form a hydromechanical transmission (HMT) unit, the face being on a side opposite to a side on which the HST case is mounted, and
    wherein the HMT unit is further provided with a housing mounting face for fixing the HMT unit to a housing of the traveling power transmission mechanism, the housing mounting face being provided on the center section so as to surround an outer circumference of a mounting face on which the planetary gear support case is mounted.

2. The hydromechanical continuously variable speed transmission according to claim 1, wherein a mounting portion for partitioning an inside of the housing into a first chamber opened toward a side of the engine and a second chamber opened toward a side of the traveling power transmission mechanism is provided on an inner wall face of the housing to protrude inward, and when the HMT unit is fixed to the housing, and
    wherein the planetary gear mechanism is positioned on a side of the second chamber while the housing mounting face of the center section is in close contact with an entire circumference of the mounting portion.

3. The hydromechanical continuously variable speed transmission according to claim 2, wherein a single drive shaft constituting the traveling power transmission mechanism is disposed in the second chamber of the housing, and wherein a portion, opposing the drive shaft, of the planetary gear support case is cut out.

* * * * *